(12) United States Patent
Ganireddy et al.

(10) Patent No.: US 11,390,173 B2
(45) Date of Patent: Jul. 19, 2022

(54) POWER SYSTEM AND AN ASSOCIATED METHOD THEREOF

(71) Applicant: GE Global Sourcing LLC, Norwalk, CT (US)

(72) Inventors: Govardhan Ganireddy, Salem, VA (US); Rupam Mukherjee, Bangalore (IN); Shahid Ali, Bangalore (IN); Ajith Kuttannair Kumar, Erie, PA (US); Manthram Sivasubramaniam, Bangalore (IN); Adnan Kutubuddin Bohori, Bangalore (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 480 days.

(21) Appl. No.: 16/500,360

(22) PCT Filed: Apr. 3, 2018

(86) PCT No.: PCT/US2018/025935
§ 371 (c)(1),
(2) Date: Oct. 2, 2019

(87) PCT Pub. No.: WO2018/187358
PCT Pub. Date: Oct. 11, 2018

(65) Prior Publication Data
US 2021/0101488 A1 Apr. 8, 2021

(30) Foreign Application Priority Data

Apr. 3, 2017 (IN) .............................. 201741011930

(51) Int. Cl.
*B60L 50/40* (2019.01)
*B60L 50/60* (2019.01)
(Continued)

(52) U.S. Cl.
CPC ................. *B60L 50/60* (2019.02); *B60L 7/22* (2013.01); *B60L 15/007* (2013.01); *B60L 15/20* (2013.01);
(Continued)

(58) Field of Classification Search
CPC .......... B60L 50/60; B60L 50/13; B60L 50/40; B60L 50/51; B60L 7/22
See application file for complete search history.

(56) References Cited

U.S. PATENT DOCUMENTS 5,998,880 A * 12/1999 Kumar .................... B60L 50/13
322/14
7,315,144 B2 * 1/2008 Imaie .................... B60L 3/0076
318/380

(Continued)

FOREIGN PATENT DOCUMENTS

| CA | 1297149 C | 3/1992 |
|---|---|---|
| JP | 2010206971 A | 9/2010 |

OTHER PUBLICATIONS

Examination Report for Indian Application No. 201741011930, dated Nov. 28, 2019, (5) pages.
(Continued)

*Primary Examiner* — Jonathan Ng
*Assistant Examiner* — James J Triggs
(74) *Attorney, Agent, or Firm* — Christopher R. Carroll; The Small Patent Law Group LLC

(57) ABSTRACT

A power system including at least one electrical machine, plurality of doubly fed induction machines (DFIMs), a plurality of first power converters, and a speed regulation unit is presented. The electrical machine includes a mechanical input end and at least one of a first stator winding terminal and a first rotor winding terminal. Each DFIM includes a second stator winding terminal, a second rotor
(Continued)

winding terminal, and a mechanical output end. At least one of the first stator winding terminal and the first rotor winding terminal is coupled to one of first power converters and the second rotor winding terminal of each DFIM is coupled to one of the first power converters. The speed regulation unit is coupled to at least one of the mechanical input end and the mechanical output end.

22 Claims, 6 Drawing Sheets

(51) Int. Cl.
 *B60L 50/13* (2019.01)
 *B60L 50/51* (2019.01)
 *B60L 7/22* (2006.01)
 *B60L 15/00* (2006.01)
 *B60L 15/20* (2006.01)
 *H02P 3/22* (2006.01)
 *H02P 27/06* (2006.01)

(52) U.S. Cl.
 CPC ............... *B60L 50/13* (2019.02); *B60L 50/40* (2019.02); *B60L 50/51* (2019.02); *H02P 3/22* (2013.01); *H02P 27/06* (2013.01); *B60L 2210/30* (2013.01); *B60L 2210/40* (2013.01); *B60L 2220/12* (2013.01); *B60L 2220/14* (2013.01); *B60L 2240/421* (2013.01)

(56) References Cited

U.S. PATENT DOCUMENTS

| | | | |
|---|---|---|---|
| 2008/0238108 A1* | 10/2008 | Edelson | B60W 10/06 290/40 C |
| 2009/0273192 A1* | 11/2009 | Guven | H02P 9/007 322/29 |
| 2016/0336928 A1* | 11/2016 | Kuznetsov | H02J 15/00 |

OTHER PUBLICATIONS

International Report on Patentability for Application No. PCT/2018/025935, dated Oct. 17, 2019, (8) pages.

International Search Report and Written Opinion dated Aug. 30, 2018 for corresponding International Application No. PCT/US2018/025935.

* cited by examiner

POWER SYSTEM AND AN ASSOCIATED METHOD THEREOF

CROSS-REFERENCE TO RELATED APPLICATIONS

This application is a national stage application, filed under 35 U.S.C. § 371, of International Patent Application No. PCT/US2018/025935, filed on 3 Apr. 2018, which claims priority to Indian Patent Application No. 201741011930, filed on 3 Apr. 2017. The entire disclosures of these applications are incorporated herein by reference.

BACKGROUND

Technical Field

Embodiments of the inventive subject matter generally relate to a power system and more specifically to a doubly fed induction machine-based power system employed in a mobile asset, such as a locomotive.

Discussion of Art

Typically, a power system of a locomotive includes an engine which is a main source of mechanical power for the locomotive. The engine is used as the power source for a generator or an alternator. The engine drives the alternator which in turn provides electrical power to move the locomotive. Particularly, the alternator generates alternating current (AC) output which is provided to traction motors mounted on carriages of the locomotive. The AC output is converted into a direct current (DC) or an AC required for operation of the traction motors using power converters. Typically, the traction motor used in such applications, is an induction motor.

In general, the power converters of the power system of the locomotive are rated to withstand full power output from the alternator. The efficiency of the power converters may be compromised since the power converters are rated to withstand full power. The power converters used in such applications are bulky. Additionally, switches employed in such power converters have a higher power rating.

Accordingly, there is a need for an enhanced power system.

BRIEF DESCRIPTION

In accordance with one embodiment of the inventive subject matter, a power system is presented. The power system includes at least one electrical machine. The at least one electrical machine includes mechanical input end and at least one of a first stator winding terminal and a first rotor winding terminal. The power system includes a plurality of doubly fed induction machines, where each doubly fed induction machine of the plurality of doubly fed induction machines includes a second stator winding terminal, a second rotor winding terminal, and a mechanical output end. Further, the power system includes a plurality of first power converters, where at least one of the first stator winding terminal or the first rotor winding terminal is coupled to one of the plurality of first power converters and where the second rotor winding terminal of each doubly fed induction machine is coupled to one of the plurality of first power converters. Moreover, the power system includes a speed regulation unit coupled to at least one of the mechanical input end of the at least one electrical machine or the mechanical output end of each doubly fed induction machine.

In accordance with another embodiment of the inventive subject matter, a mobile asset is presented. The mobile asset includes a prime mover and a power system. The power system includes at least one electrical machine. The at least one electrical machine includes a mechanical input end and at least one of a first stator winding terminal or a first rotor winding terminal, where the mechanical input end of the at least one electrical machine is coupled to the prime mover. The power system further includes a plurality of doubly fed induction machines, where each doubly fed induction machine of the plurality of doubly fed induction machines includes a second stator winding terminal, a second rotor winding terminal, and a mechanical output end. Further, the power system includes a plurality of first power converters, where at least one of the first stator winding terminal or the first rotor winding terminal is coupled to one of the plurality of first power converters and where the second rotor winding terminal of each doubly fed induction machine is coupled to one of the plurality of first power converters. Moreover, the power system includes a speed regulation unit coupled to at least one of the mechanical input end of the at least one electrical machine or the mechanical output end of each doubly fed induction machine. The mobile asset also includes at least one wheel coupled to the mechanical output end of each of the plurality of doubly fed induction machines.

In accordance with yet another embodiment of the inventive subject matter, a method of operating a power system is presented. The method includes controlling at least one of an input mechanical quantity of a mechanical input end of at least one electrical machine using a speed regulation unit and an input quantity of a first rotor winding terminal of the at least one electrical machine, using a plurality of first power converters. The method further includes generating an output electrical quantity having a determined frequency at a first stator winding terminal of the at least one electrical machine based on at least one of the controlled input mechanical of at least one of the mechanical input end or the input quantity of the first rotor winding terminal. Also, the method includes transmitting the generated output electrical quantity to at least one of a second stator winding terminal or a corresponding first power converter of the plurality of first power converters coupled to a second rotor winding terminal of a corresponding doubly fed induction machine of a plurality of doubly fed induction machines. Moreover, the method includes regulating an input quantity of the second rotor winding terminal of each of the plurality of doubly fed induction machines using the corresponding first power converter coupled to the second rotor winding terminal. The method further includes generating a determined value of an output mechanical quantity at a mechanical output end of each of the plurality of doubly fed induction machines based on the regulation of the input quantity of the second rotor winding terminal.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As will be described in detail hereinafter, various embodiments of an exemplary power system and a method of operating the power system is disclosed. In particular, different topologies of the exemplary power system using a doubly fed induction machine is disclosed. The exemplary power system and the method of operation of the power system may be employed in any mobile asset, such as a locomotive, off-highway vehicles (OHV), and the like.

Figure 1:
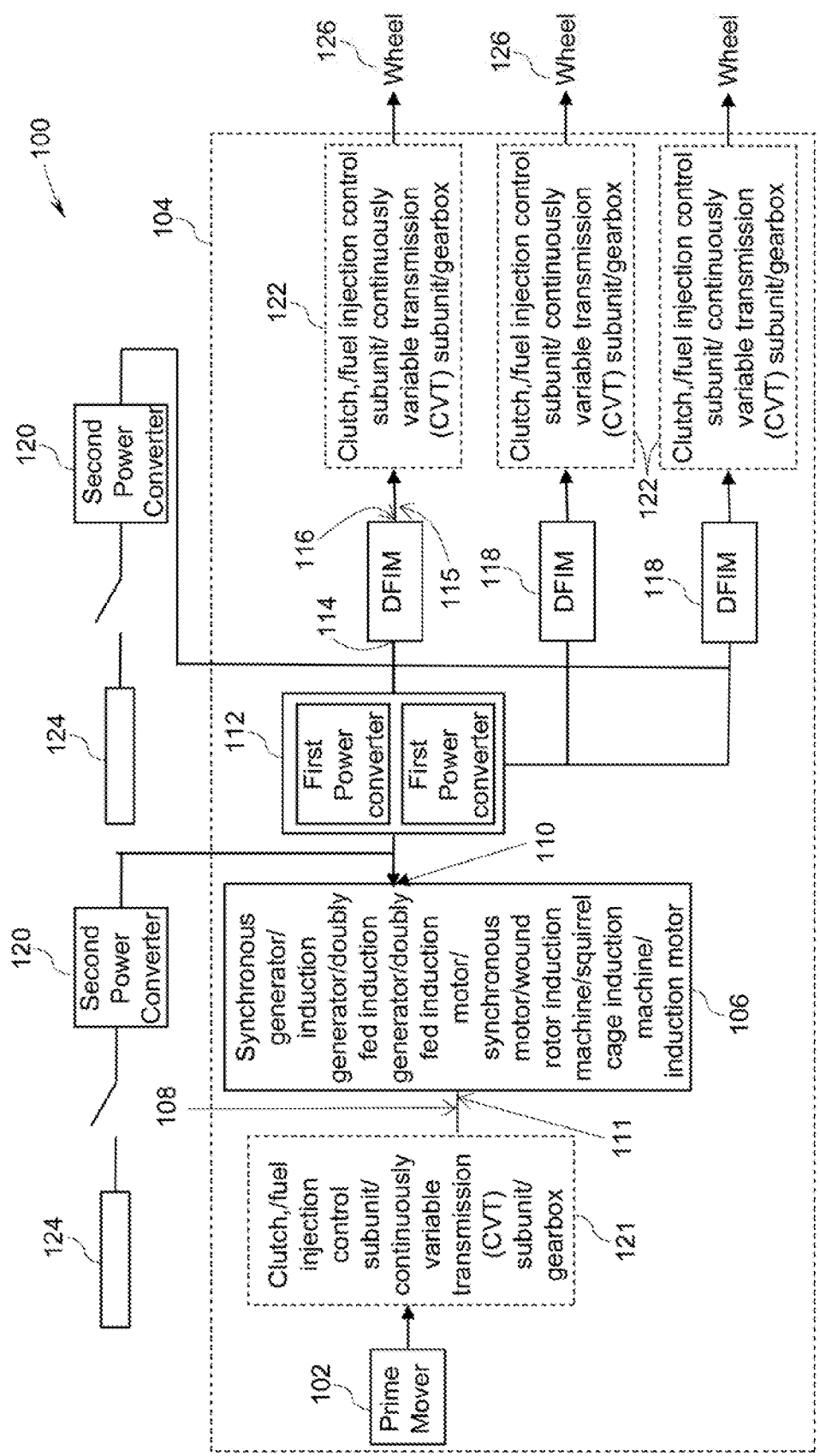
FIG. 1 is a block diagram of a power system of a mobile asset in accordance with certain embodiments of the inventive subject matter.

Turning now to the drawings and by way of example in FIG. 1, a block diagram of a mobile asset 100 in accordance with certain embodiments of the inventive subject matter is disclosed. The mobile asset 100 includes a prime mover 102, a power system 104, and a plurality of wheels 126. The prime mover 102 is coupled to the power system 104. In one embodiment, the prime mover 102 is an engine. Further, the power system 104 is coupled to the plurality of wheels 126 of the mobile asset 100.

The power system 104 includes at least one electrical machine 106 and a plurality of doubly fed induction machines 118. Each of the at least one electrical machine 106 and a plurality of doubly fed induction machines 118 includes a rotor and a stator (not shown). Furthermore, the power system 104 includes a plurality of speed regulation units 121, 122. Each of the speed regulation units 121, 122 is at least one of a clutch, a fuel injection control subunit, a continuously variable transmission (CVT) subunit, and a gearbox. The power system 104 further includes a plurality of first power converters 112. The plurality of first power converters 112 is coupled to the at least one electrical machine 106 and the plurality of doubly fed induction machines 118. The plurality of first power converters 112 includes at least one of an alternating current (AC) to AC converter, a direct current (DC) to AC converter, an AC to DC converter, and a diode based rectifier.

The at least one electrical machine 106 is at least one of a synchronous generator, an induction generator, a doubly fed induction generator, a doubly fed induction motor, a synchronous motor, a wound rotor induction machine, a squirrel cage induction machine, and an induction motor.

During a motoring operation of the mobile asset 100, the at least one electrical machine 106 operates as a generator and each of the plurality of doubly fed induction machines 118 operates as a doubly fed induction motor. The term "motoring operation," as used herein, refers to an operation when a combination of the electrical and mechanical power is transferred from at least one electrical machine 106 of the power system 104 to the wheels 126.

Further, in one embodiment, during a braking operation, the at least one electrical machine 106 operates as a motor and each of the plurality of doubly fed induction machines 118 operates as a doubly fed induction generator. The term "braking operation," as used herein, refers to an operation when a stored mechanical energy of a mobile asset is converted to a corresponding electrical energy and transferred to the power system 104 during braking of the wheels 126.

The at least one electrical machine 106 includes a mechanical input end 108, at least one of a first stator winding terminal 110 and a first rotor winding terminal 111. The first rotor winding terminal 111 and the first stator winding terminal 110 of the at least one electrical machine 106 are used for inputting and transmitting electrical quantities, such as current, power, and voltage. The mechanical input end 108 is a rotor end of the at least one electrical machine 106. The term "mechanical input end," as used herein, refers to an end where a mechanical input such as speed or torque is provided. Specifically, the prime mover 102 is coupled via a speed regulation unit 121 to the mechanical input end of the at least one electrical machine 106. The prime mover 102 is configured to drive the at least one electrical machine 106. The speed regulation unit 121 is configured to change the speed of the at least one electrical machine.

Each of the plurality of doubly fed induction machines 118 includes a second stator winding terminal 114, a second rotor winding terminal 116, and a mechanical output end 115. The second rotor winding terminal 116 and the second stator winding terminal 114 of each of the plurality of doubly fed induction machines 118 are used for inputting and transmitting electrical quantities, such as current, power, and voltage. The mechanical output end 115 of each of the plurality of doubly fed induction machine 118 is coupled to the wheels 126 via the speed regulation unit 122. Each of the plurality of doubly fed induction machine 118 is configured to drive the wheels 126. The speed regulation unit 122 is configured to change the speed of the wheels 126.

In the illustrated embodiment, the power system 104 includes two second power converters 120. One of the second power converter 120 is coupled to the at least one the electrical machine 106. Other second power converter 120 is coupled to each of the plurality of doubly fed induction machines 118. Each of the two second power converters 120 is further coupled to at least one brake resistor unit 124. In one embodiment, during the braking operation, mechanical power is transferred from the wheels 126 to the at least one brake resistor unit 124 via each of the doubly fed induction machines 118. Subsequently, the electrical power is dissipated across the at least one brake resistor unit 124. Although the example of FIG. 1 represents two second power converters, the number of second power converters may vary in different embodiments. The braking operation of the mobile asset 100 is described in greater detail below with reference to FIG. 5.

Figure 2:
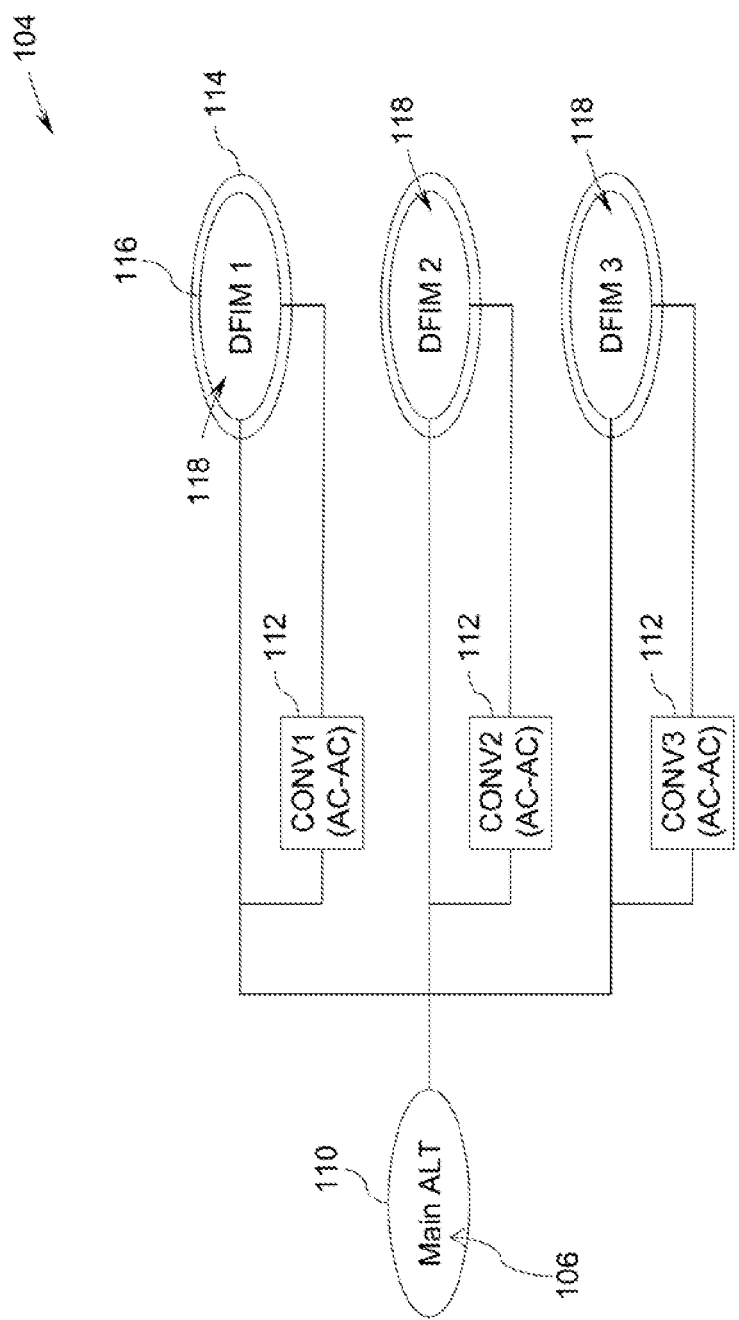
FIG. 2 is a diagrammatical representation of a power system in accordance with certain embodiments of the inventive subject matter.

Referring now to FIG. 2, a diagrammatical representation of one embodiment of a power system 104 in accordance with certain embodiments of the inventive subject matter is disclosed. The power system 104 includes the electrical machine 106, the plurality of doubly fed induction machines 118, and a plurality of first power converters 112. In the illustrated embodiment, the electrical machine 106 is an alternator or a synchronous generator.

In the illustrated embodiment, the plurality of first power converters 112 includes a plurality of alternating current (AC) to AC converters. Each of the plurality of AC to AC converters is coupled to the second rotor winding terminal 116 of each of the doubly fed induction machines 118. Further, each of the plurality of AC to AC converters is coupled to the first stator winding terminal 110 of the electrical machine 106. In one embodiment, the AC to AC converter is a rotor side converter of each of the doubly fed induction machines 118. Additionally, the first stator winding terminal 110 is coupled to the second stator winding terminal 114 of each of the plurality of doubly fed induction machines 118.

Implementing the topology of FIG. 2, the AC to AC converter has to handle only a portion of power generated by the electrical machine 106. Accordingly, the AC to AC converter has a partial power rating. The rating of the AC to AC converter is of a considerably lower value when compared to power converters employed in the conventional power systems for mobile assets.

Figure 3:
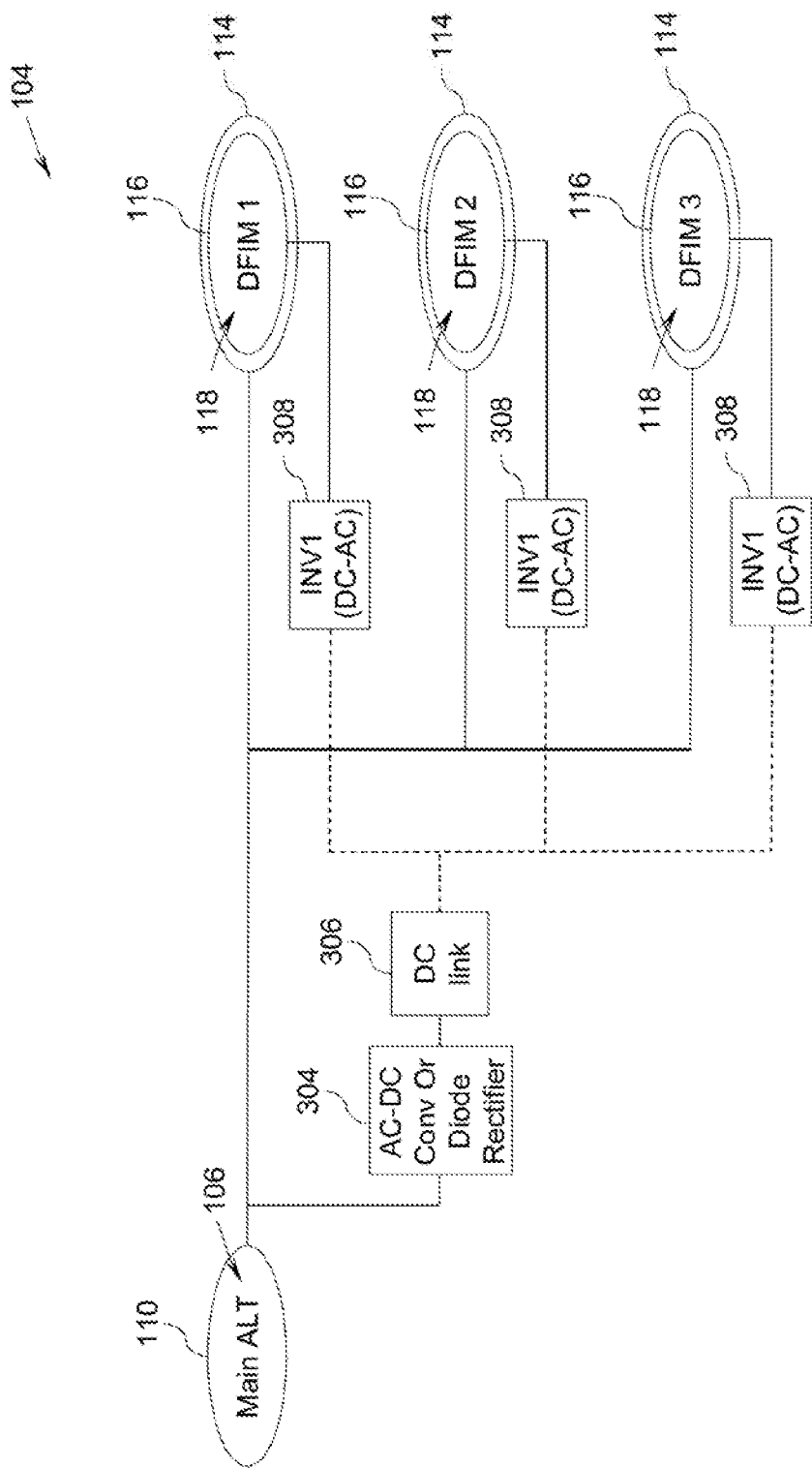
FIG. 3 is a diagrammatical representation of a power system in accordance with another embodiment of the inventive subject matter.

FIG. 3 is a diagrammatical representation the power system 104 in accordance with another embodiment of the inventive subject matter. In the illustrated embodiment, the electrical machine 106 is an alternator or a synchronous generator.

Each of the plurality of doubly fed induction machines 118 includes a doubly fed induction motor. The power system 104 further includes a AC to DC converter 304, a DC link 306, and a plurality of DC to AC converters 308. In one embodiment, instead of the AC to DC converter 304, a diode rectifier may be employed.

The first stator winding terminal 110 of the at least one electrical machine 106 is coupled to the second rotor winding terminal 116 of each of the plurality of doubly fed induction machines 118 via at least one of the AC to DC converter 304, the DC link 306, and a corresponding DC to AC converter of the plurality of DC to AC converters 308. Also, the AC to DC converter 304 is operatively coupled to the first stator winding terminal 110 of the electrical machine 106. Further, the AC to DC converter 304 is operatively coupled to the DC link 306. Furthermore, each of the plurality of DC to AC converters 308 is coupled to the DC link 306 and the second rotor winding terminal 116 of the corresponding doubly fed induction machine 118. Further, the first stator winding terminal 110 is coupled to the second stator winding terminal 114 of each of the plurality of doubly fed induction machines 118.

Implementing the topology of FIG. 3, the AC to DC converter 304 and the DC to AC converter 308 needs to handle only a portion of power generated by the electrical machine 106. Accordingly, the AC to DC converter 304 and the DC to AC converter 308 have a partial power rating. The rating of the AC to DC converter 304 and the DC to AC converter 308 is of a considerably lower value when compared to power converters employed in the conventional power systems for mobile assets.

Figure 4:
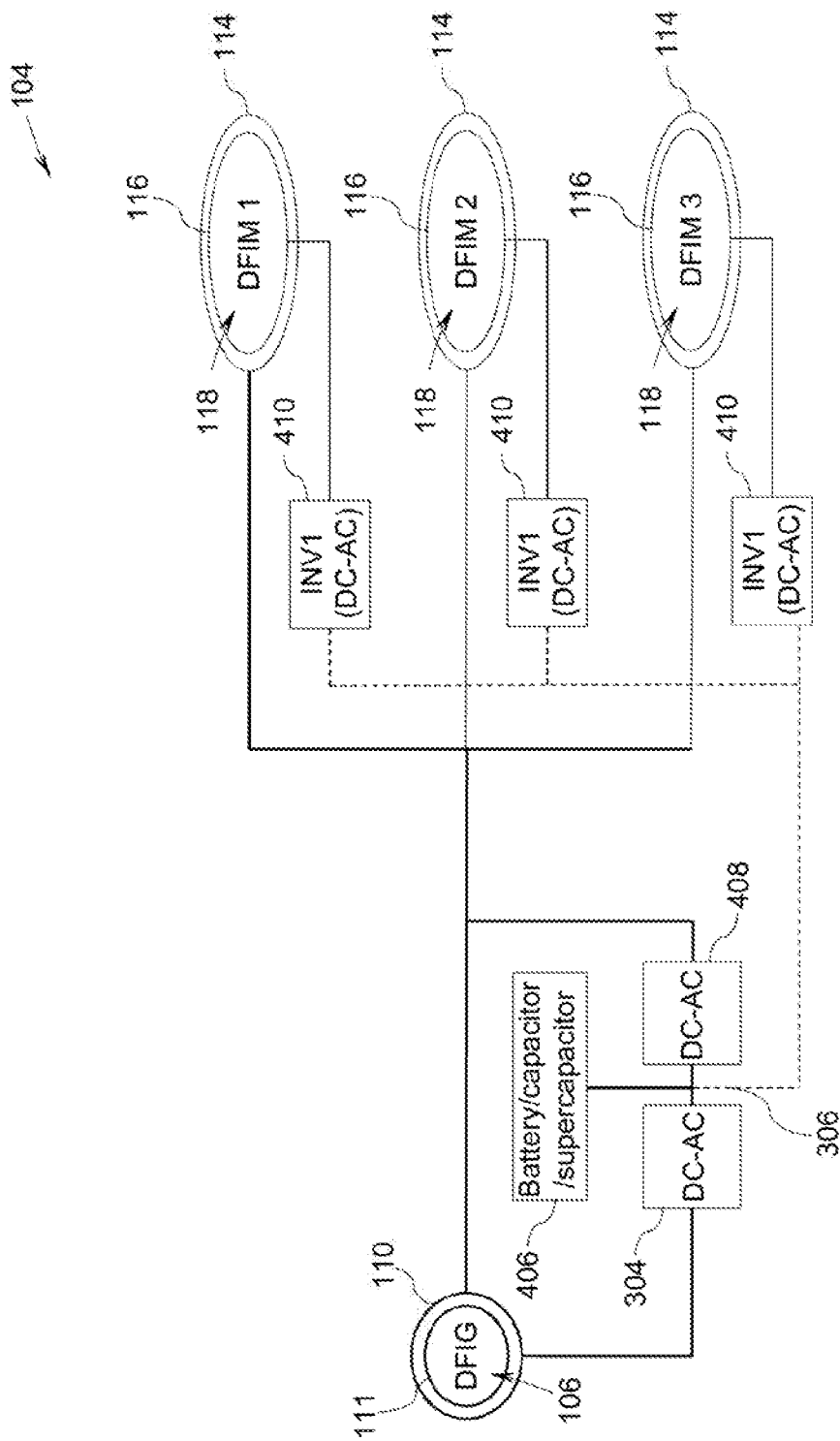
FIG. 4 is a diagrammatical representation of a power system in accordance with another embodiment of the inventive subject matter.

Referring now to FIG. 4, a diagrammatical representation of the power system 104 in accordance with another embodiment of the inventive subject matter is shown.

The power system 104 includes the electrical machine 106 which is a doubly fed induction machine. In particular, the electrical machine 106 is a doubly fed induction generator. Further, the electrical machine 106 includes the first stator winding terminal 110 and the first rotor winding terminal 111.

The power system 104 further includes the plurality of doubly fed induction machines 118. Each of the plurality of doubly fed induction machines 118 is a doubly fed induction motor. Each of the plurality of doubly fed induction machines 118 includes the second rotor winding terminal 116 and the second stator winding terminal 114.

The power system 104 further includes the AC to DC converter 304, a plurality of first DC to AC converters 410, and the DC link 306. The DC link 306 is further coupled to an energy source 406. The energy source 406 is configured to maintain a pre-determined voltage at the DC link 306. In one embodiment, the energy source 406 includes a battery and a capacitor. In one specific embodiment, the capacitor may be a supercapacitor.

The first rotor winding terminal 111 of the electrical machine 106 is coupled to the second rotor winding terminal 116 of each of the plurality of doubly fed induction machines 118 via the AC to DC converter 304, the energy source 406, the DC link 306, and a corresponding first DC to AC converter of the plurality of first DC to AC converters 410. The AC to DC converter 304 is operatively coupled to the first rotor winding terminal 111 of the electrical machine 106. Further, the AC to DC converter 304 is operatively coupled to the DC link 306.

Furthermore, each of the plurality of first DC to AC converters 410 is coupled to the DC link 306 and the second rotor winding terminal 116 of the corresponding doubly fed induction machine 118. Further, the first stator winding terminal 110 is coupled to the second stator winding terminal 114 of each of the plurality of doubly fed induction machines 118.

The power system 104 further includes a second DC to AC converter 408. The second DC to AC converter 408 may also be alternatively referred to as a DC link controller. The second DC to AC converter 408 is coupled to at least one of the first stator winding terminal 110 of the electrical machine 106, the second stator winding terminal 208 of each of the plurality of doubly fed induction machines 118, and the DC link 306. Particularly, the DC link 306 is coupled to the second DC to AC converter 408. The second DC to AC converter 408 is also configured to maintain the pre-determined voltage at the DC link 306.

Implementing the topology of FIG. 4, the AC to DC converter 304 and the second DC to AC converter 408 needs to handle only a portion of power generated by the electrical machine 106. Accordingly, the AC to DC converter 304 and the second DC to AC converter 408 have a partial power rating. In one embodiment, the AC to DC converter 304 and the second DC to AC converter 408 are rated for 30 percent of the total power generated by the electrical machine 106. Furthermore, as noted hereinabove with respect to preceding figures, the first DC to AC converters 410 coupled to the doubly fed induction machines 118 are rated for a considerably lower value of power when compared to power converters employed in the conventional power systems for mobile assets.

Figure 5:
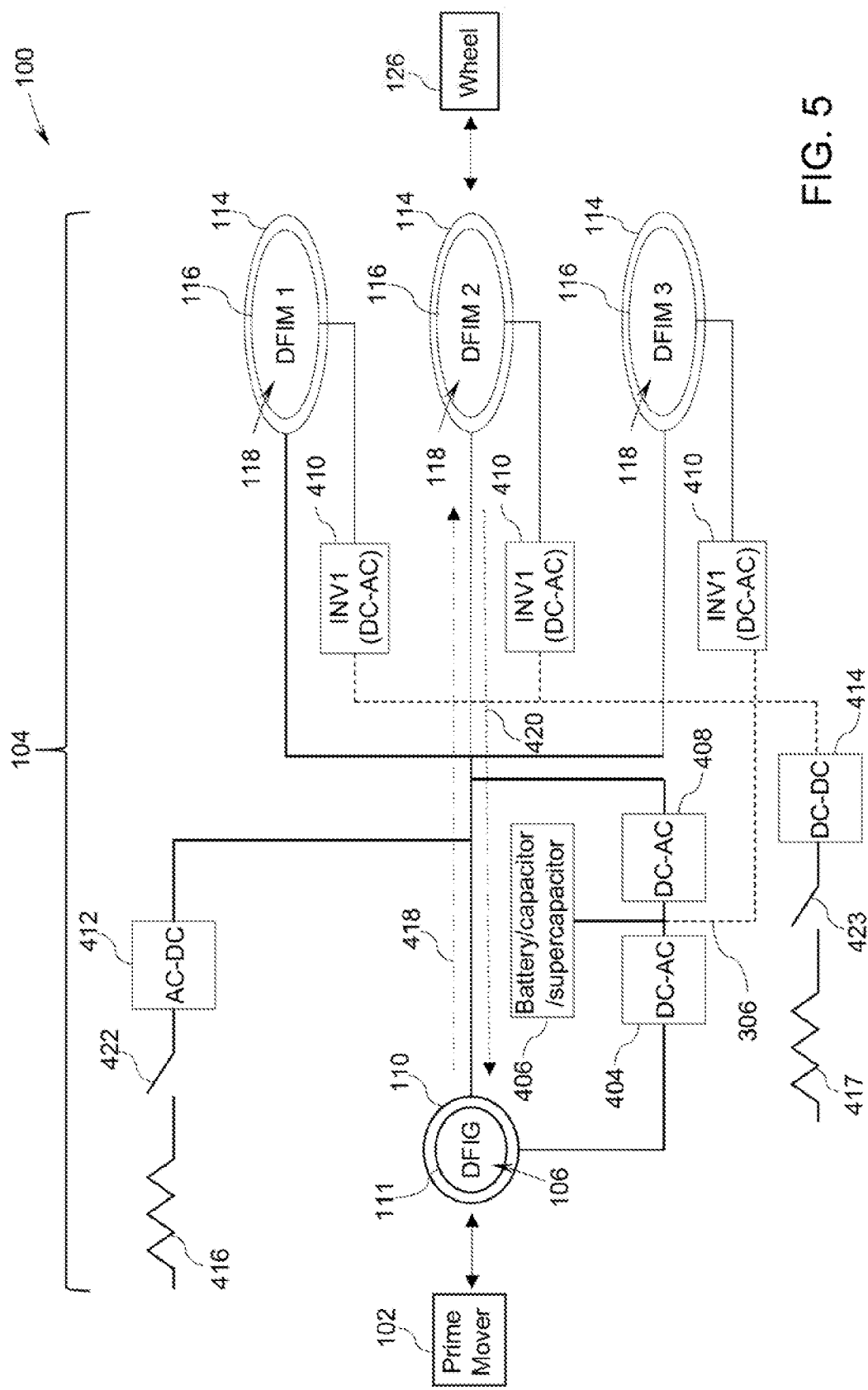
FIG. 5 is a diagrammatical representation of a power system in accordance with another embodiment of the inventive subject matter.

FIG. 5 is a diagrammatical representation of the mobile asset 100 in accordance with another embodiment of the inventive subject matter. The mobile asset 100 includes the power system 104 having the electrical machine 106. Further, the electrical machine 106 includes the first stator winding terminal 110 and the first rotor winding terminal 111. During the motoring operation of the mobile asset 100, the electrical machine 106 operates as a doubly fed induction generator. In one embodiment, during a braking operation of the mobile asset 100, the electrical machine 106 operates as a doubly fed induction motor.

The power system 104 further includes the plurality of doubly fed induction machines 118. Each of the plurality of doubly fed induction machines 118 includes the second rotor winding terminal 116 and the second stator winding terminal 114. During the motoring operation, each of the plurality of doubly fed induction machines 118 operates as a doubly fed induction motor. Further, during the braking operation, each of the plurality of doubly fed induction machines 118 operates as a doubly fed induction generator.

Further, the power system 104 includes a first AC to DC converter 404, the plurality of first DC to AC converters 410, and the DC link 306. The first AC to DC converter 404 is operatively coupled to the first rotor winding terminal 111 of the electrical machine 106. Further, the first AC to DC converter 404 is operatively coupled to the DC link 306. The DC link 306 is further coupled to the energy source 406. The energy source 406 is configured to maintain a pre-determined voltage at the DC link 306.

In the illustrated embodiment, the power system 104 further includes a second DC to AC converter 408 coupled to the DC link 306. The second DC to AC converter 408 is further coupled to the first stator winding terminal 110. In one embodiment, the second DC to AC converter 408 is also configured to maintain a pre-determined voltage at the DC link 306.

Further, each of the plurality of first DC to AC converters 410 is coupled to the DC link 306 and the second rotor winding terminal 116 of the corresponding doubly fed induction machine 118. Further, the first stator winding terminal 110 is coupled to the second stator winding terminal 114 of each of the plurality of doubly fed induction machines 118.

Additionally, the power system 104 includes a second AC to DC converter 412 and a DC to DC converter 414. The second AC to DC converter 412 is coupled to the first stator winding terminal 110. Further the second AC to DC converter 412 is coupled to a brake resistor unit 416 via a switch 422. The second AC to DC converter 412 is further coupled to at least one of the second stator winding terminal 114. The DC to DC converter 414 is operatively coupled to the DC link 306. Further, the DC to DC converter 414 is operatively coupled to a brake resistor unit 417 via a switch 423. Arrow 418 is indicative of a direction of power transmission during the motoring operation. Arrow 420 is indicative of a direction of power transmission during the braking operation.

During braking operation, mechanical power is transmitted from the wheels 126 of the mobile asset 100 to the plurality of doubly fed induction machines 118. Further, the electrical power is transmitted from the second stator winding terminal 114 of each of the plurality of doubly fed induction machines 118 to the second AC to DC converter 412. Furthermore, the electrical power is transmitted from second AC to DC converter 412 to the brake resistor unit 416 via the switch 422. The transmitted electrical power is dissipated across the brake resistor unit 416.

Additionally, the electrical power is transmitted from the second rotor winding terminal 116 of each of the plurality of doubly fed induction machines 118 to the brake resistor unit 417 via the first DC to AC converters 410, the DC to DC converter 414, and the switch 423. The transmitted electrical power is dissipated across the brake resistor unit 417. The switches 422 and 423 are closed during the braking operation.

In another embodiment, the electrical power from the second rotor winding terminal 116 of each of the plurality of doubly fed induction machines 118 is transmitted to the DC link 306. As a result, the voltage at the DC link 306 exceeds beyond a pre-determined value of the DC link 306. In such a scenario, excess voltage appearing across the DC link 306 is stored in the energy source 406.

In yet another embodiment, the electrical power from the second rotor winding terminal 116 of each of the plurality of doubly fed induction machines 118 is converted and transmitted as mechanical power to the prime mover 102 via the corresponding first DC to AC converters 410, the DC link 306, the first AC to DC converter 404 and the electrical machine 106. Use of a fuel for powering the prime mover 102 may be minimized since mechanical power is provided to the prime mover 102.

Implementing the topology of FIG. 5, the plurality of first power converters and the plurality of second power converters have a low power rating when compared to power converters employed in the conventional power systems for mobile assets. Further, use of doubly fed induction machines coupled to an engine and wheels aids in efficient transfer and use of power during both the motoring operation and the braking operation.

Figure 6:
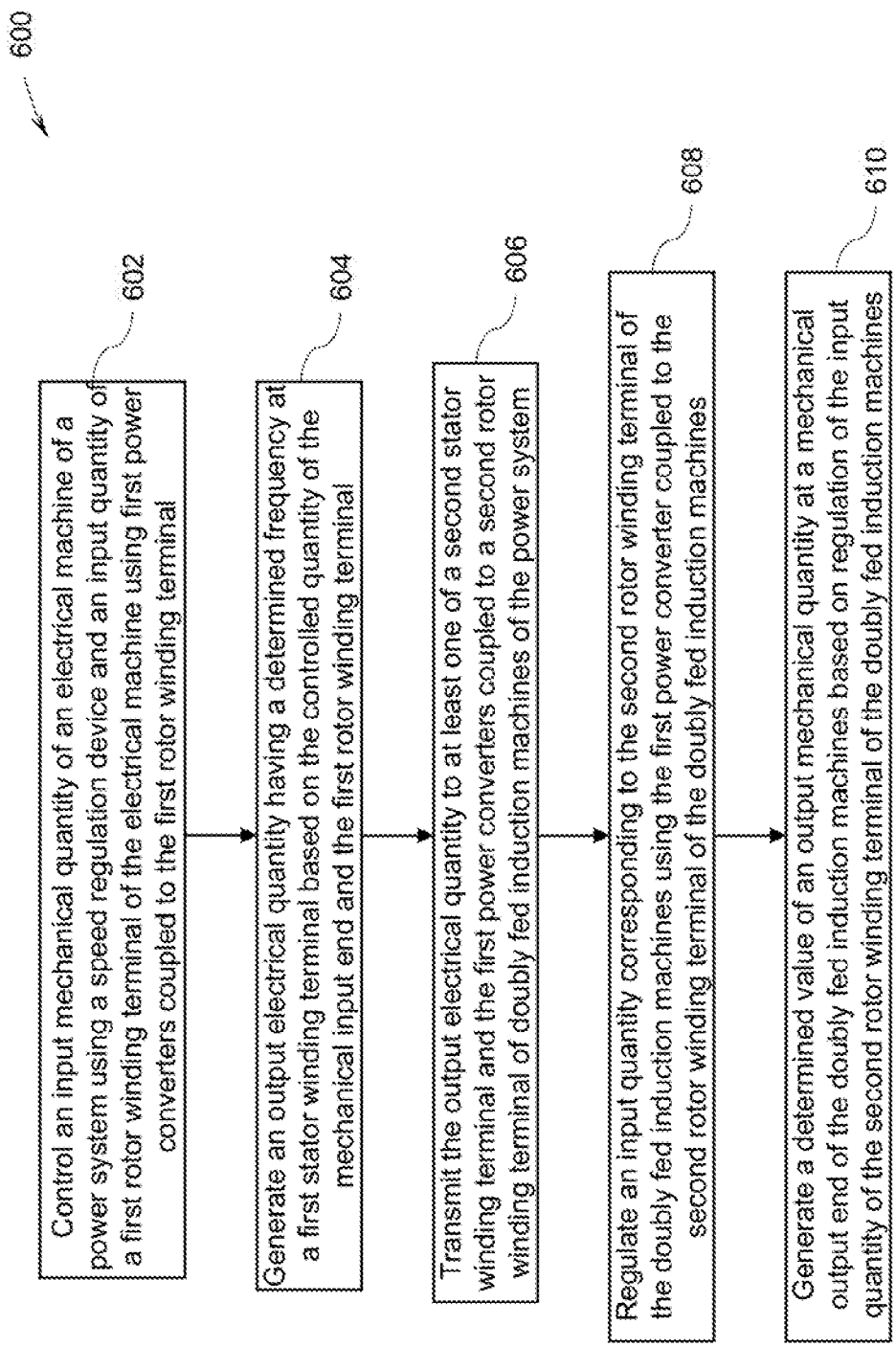
FIG. 6 is a flow chart illustrating an exemplary method of operation of a power system in accordance with certain embodiments of the inventive subject matter.

FIG. 6 is a flow chart 600 illustrating an exemplary method of operation of a power system in accordance with certain embodiments of the inventive subject matter. In particular, flow chart 600 represents a method of motoring operation of a mobile asset. In one embodiment, the mobile asset is a locomotive. At block 602, at least one of an input mechanical quantity of a mechanical input end of at least one electrical machine of a power system of a mobile asset is controlled using a speed regulation unit and an input quantity of a first rotor winding terminal of the at least one electrical machine is controlled using a plurality of first power converters. The terms quantity and parameter may be used alternatively in the current specification.

The input mechanical quantity may be controlled by controlling a speed of a prime mover such as an engine. The speed of the prime mover is controlled using the speed regulation unit. The speed regulation unit includes at least one of a clutch, a fuel injection control subunit, a continuously variable transmission (CVT) subunit, and a gearbox. Additionally, the fuel injection control subunit controls an amount of fuel injected into the prime mover.

The input quantity of the first rotor winding terminal of the at least one electrical machine is controlled by regulating switching of the plurality of first power converters. The term "input quantity," as used herein refers to voltage, current, or power. In one embodiment, at least one of a frequency or an amplitude of the input quantity may be controlled.

Further, at block 604, an output electrical quantity having a determined frequency is generated at a first stator winding terminal of the at least one electrical machine based on the controlled input mechanical quantity. In particular, the output electrical quantity having a determined frequency is generated at the first stator winding terminal of the at least one electrical machine based on at least one of the controlled input mechanical quantity and the controlled input quantity. The term "output electrical quantity," as used herein, refers to voltage, current, or power. In one embodiment, there is a corresponding variation in frequency of the output electrical quantity based on variation in speed at the mechanical input end of the electrical machine and amplitude or frequency at the first rotor winding terminal.

At block 606, the generated output electrical quantity is transmitted to at least one of a second stator winding terminal and a first power converter of the plurality of first power converters coupled to a second rotor winding terminal of a corresponding doubly fed induction machine of a plurality of doubly fed induction machines of the power system.

Further, at block 608, an input quantity of the second rotor winding terminal of each of the plurality of doubly fed induction machines is regulated using a corresponding first power converter. In one embodiment, a frequency or an amplitude of the input quantity is regulated. The input quantity may include voltage or current. The input quantity is regulated by regulating switches of the corresponding first power converter of the plurality of first power converters.

Additionally, at block 610, a determined value of an output mechanical quantity is generated at a mechanical output end of each of the plurality of doubly fed induction machines based on regulation of the input quantity. The output mechanical quantity generated at the mechanical output end of each of the plurality of doubly fed induction machines includes a speed, a torque, and the like. The output mechanical quantity generated at the mechanical output end of each of the plurality of doubly fed induction machines is provided to the corresponding wheels of the mobile asset. Further, a speed regulation unit is provided to modify the output mechanical quantity before transmitting to the corresponding wheels of the mobile asset.

Implementing the method of FIG. 6, the output mechanical quantity is generated at the mechanical output end of each of the plurality of doubly fed induction machines such that torque is provided to the wheels per demand thereby preventing supply of excess torque. Thus, implementing the method of FIG. 6 allows efficient transfer of power in the power system of the mobile asset.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, terms "circuit" and "circuitry" and "controlling unit" may include either a single component or a plurality of components, which are either active and/or passive and are connected or otherwise coupled together to provide the described function. In addition, the term "operatively coupled," as used herein includes wired coupling, wireless coupling, electrical coupling, magnetic coupling, radio communication, software-based communication, or combinations thereof.

The foregoing process steps may be implemented by suitable code on a processor-based system such as a general-purpose or special-purpose computer. It should also be noted herein that some or all of the steps described herein may be performed in different orders or concurrently. Furthermore, the functions may be implemented in a variety of programming languages including but not limited to C++ or Java. Such codes may be stored or adapted for storage on one or more tangible, machine readable media such as on data repository chips, local or remote hard disks, optical disks (CDs or DVDs), memory or other media, which may be accessed by the processor-based system to execute the stored code. The tangible media may include paper or other suitable mediums upon which the instructions are printed. The instructions may be electronically captured via optical scanning of the paper or other medium, then compiled, interpreted or otherwise processed in a suitable manner if necessary, and then stored in the data repository or memory.

In accordance with the embodiments discussed herein, the exemplary power system facilitates use of power converters having low power rating compared to power converters employed in conventional power systems. Further, use of doubly fed induction machines enables efficient transfer of power during both the motoring operation and the braking operation of the mobile asset. The power system using a doubly fed induction machine and associated method may be used in any mobile assets, such as locomotives, off-highway vehicles, and the like.

While the inventive subject matter has been described with reference to exemplary embodiments, it will be understood by those skilled in the art that various changes may be made and equivalents may be substituted for elements thereof without departing from the scope of the inventive subject matter. In addition, many modifications may be made to adapt a particular situation or material to the teachings of the inventive subject matter without departing from the essential scope thereof.

The invention claimed is:

1. A power system comprising:
   at least one electrical machine comprising a mechanical input end and at least one of a first stator winding terminal and a first rotor winding terminal;
   a plurality of doubly fed induction machines, wherein each of the doubly fed induction machines comprises a second stator winding terminal, a second rotor winding terminal, and a mechanical output end;
   a plurality of first power converters, wherein at least one of the first stator winding terminal or the first rotor winding terminal is coupled to one of the first power converters and wherein the second rotor winding terminal of each of the doubly fed induction machines is coupled to one of the first power converters; and
   a speed regulation unit coupled to at least one of the mechanical input end of the at least one electrical machine or the mechanical output end of each of the doubly fed induction machines.

2. The power system of claim 1, wherein the speed regulation unit comprises at least one of a clutch, a fuel injection control subunit, a continuously variable transmission (CVT) subunit, or a gearbox.

3. The power system of claim 1, wherein the at least one electrical machine comprises at least one of a synchronous generator, an induction generator, a doubly fed induction generator, a doubly fed induction motor, a synchronous motor, a wound rotor induction machine, a squirrel cage induction machine, or an induction motor.

4. The power system of claim 1, wherein the doubly fed induction machines include at least one of a doubly fed induction generator or a doubly fed induction motor.

5. The power system of claim 1, wherein the first power converters include at least one of an alternating current (AC) to AC converter, a direct current (DC) to AC converter, an AC to DC converter, or a diode-based rectifier.

6. The power system of claim 1, wherein the first power converters include an alternating current (AC) to AC converter, wherein the AC to AC converter is coupled to the first stator winding terminal of the at least one electrical machine and the second rotor winding terminal of a corresponding doubly fed induction machine of the doubly fed induction machines.

7. The power system of claim 1, wherein the first stator winding terminal of the at least one electrical machine is coupled to the second stator winding terminal of each of the doubly fed induction machines.

8. The power system of claim 1, wherein the first power converters include an alternating current (AC) to direct current (DC) converter and a plurality of DC to AC converters, wherein the first stator winding terminal of the at least one electrical machine is coupled to the second rotor winding terminal of each of the doubly fed induction machines via at least one of the AC to DC converter, a DC link, or a corresponding DC to AC converter of the plurality of DC to AC converters.

9. The power system of claim 1, wherein the first power converters include a first alternating current (AC) to direct current (DC) converter and a plurality of first DC to AC converters, wherein the first rotor winding terminal of the at least one electrical machine is coupled to the second rotor winding terminal of each of the doubly fed induction machines via at least one of the first AC to DC converter, at least one energy source, a DC link, or a corresponding first DC to AC converter of the first DC to AC converters.

10. The power system of claim 9, further comprising a DC link controller coupled to at least one of the first stator winding terminal of the at least one electrical machine, the second stator winding terminal of each of the doubly fed induction machines, or the DC link.

11. The power system of claim 10, wherein the first rotor winding terminal of the at least one electrical machine is coupled to the second rotor winding terminal of each of the doubly fed induction machines via the first AC to DC converter, the at least one energy source, the DC link, and the corresponding first DC to AC converter of the plurality of first DC to AC converters, wherein at least one of the DC link controller or the at least one energy source is configured to maintain a pre-determined voltage across the DC link.

12. The power system of claim 11, wherein the DC link controller is a second DC to AC converter.

13. The power system of claim 9, further comprising a plurality of second power converters comprising at least one second AC to DC converter and a DC to DC converter.

14. The power system of claim 13, further comprising at least one brake resistor unit coupled to the first stator winding terminal via at least one of a switch or the at least one second AC to DC converter.

15. The power system of claim 13, further comprising at least one brake resistor unit coupled to at least one of the DC link or the plurality of first DC to AC converters via the DC to DC converter and a switch.

16. The power system of claim 9, wherein the at least one energy source comprises at least one of a battery or a capacitor.

17. The power system of claim 9, wherein the at least one energy source is configured to be charged when an excess power in the power system is transmitted to the at least one energy source.

18. A mobile asset comprising:
a prime mover;
a power system comprising:
at least one electrical machine comprising a mechanical input end and at least one of a first stator winding terminal or a first rotor winding terminal, wherein the mechanical input end of the at least one electrical machine is coupled to the prime mover;
a plurality of doubly fed induction machines, wherein each of the doubly fed induction machines comprises a second stator winding terminal, a second rotor winding terminal, and a mechanical output end;
a plurality of first power converters, wherein at least one of the first stator winding terminal or the first rotor winding terminal is coupled to one of the first power converters and wherein the second rotor winding terminal of each of the doubly fed induction machines is coupled to one of the first power converters; and
a speed regulation unit coupled to at least one of the mechanical input end of the at least one electrical machine or the mechanical output end of each of the doubly fed induction machines; and
at least one wheel coupled to the mechanical output end of each of the doubly fed induction machines.

19. The mobile asset of claim 18, wherein the mobile asset is a locomotive.

20. A method of operating a power system, the method comprising:
controlling at least one of an input mechanical quantity of a mechanical input end of at least one electrical machine using a speed regulation unit or an input quantity of a first rotor winding terminal of the at least one electrical machine, using a plurality of first power converters;
generating an output electrical quantity having a determined frequency at a first stator winding terminal of the at least one electrical machine based on at least one of the controlled input mechanical of at least one of the mechanical input end or the input quantity of the first rotor winding terminal; and
transmitting the generated output electrical quantity to at least one of a second stator winding terminal or a corresponding first power converter of the plurality of first power converters coupled to a second rotor winding terminal of a corresponding doubly fed induction machine of a plurality of doubly fed induction machines;
regulating an input quantity of the second rotor winding terminal of each of the doubly fed induction machines using the corresponding first power converter coupled to the second rotor winding terminal; and
generating a determined value of an output mechanical quantity at a mechanical output end of each of the doubly fed induction machines based on the regulation of the input quantity of the second rotor winding terminal.

21. The method of claim 20, further comprising modifying the output mechanical quantity at the mechanical output end of each of the doubly fed induction machines, using the speed regulation unit.

22. The method of claim 20, further comprising providing power via the doubly fed induction machines and a plurality of second power converters to at least one of at least one brake resistor unit, an energy source, or a combination of the at least one electrical machine and a prime mover.

* * * * *